United States Patent Office 3,437,828
Patented Apr. 8, 1969

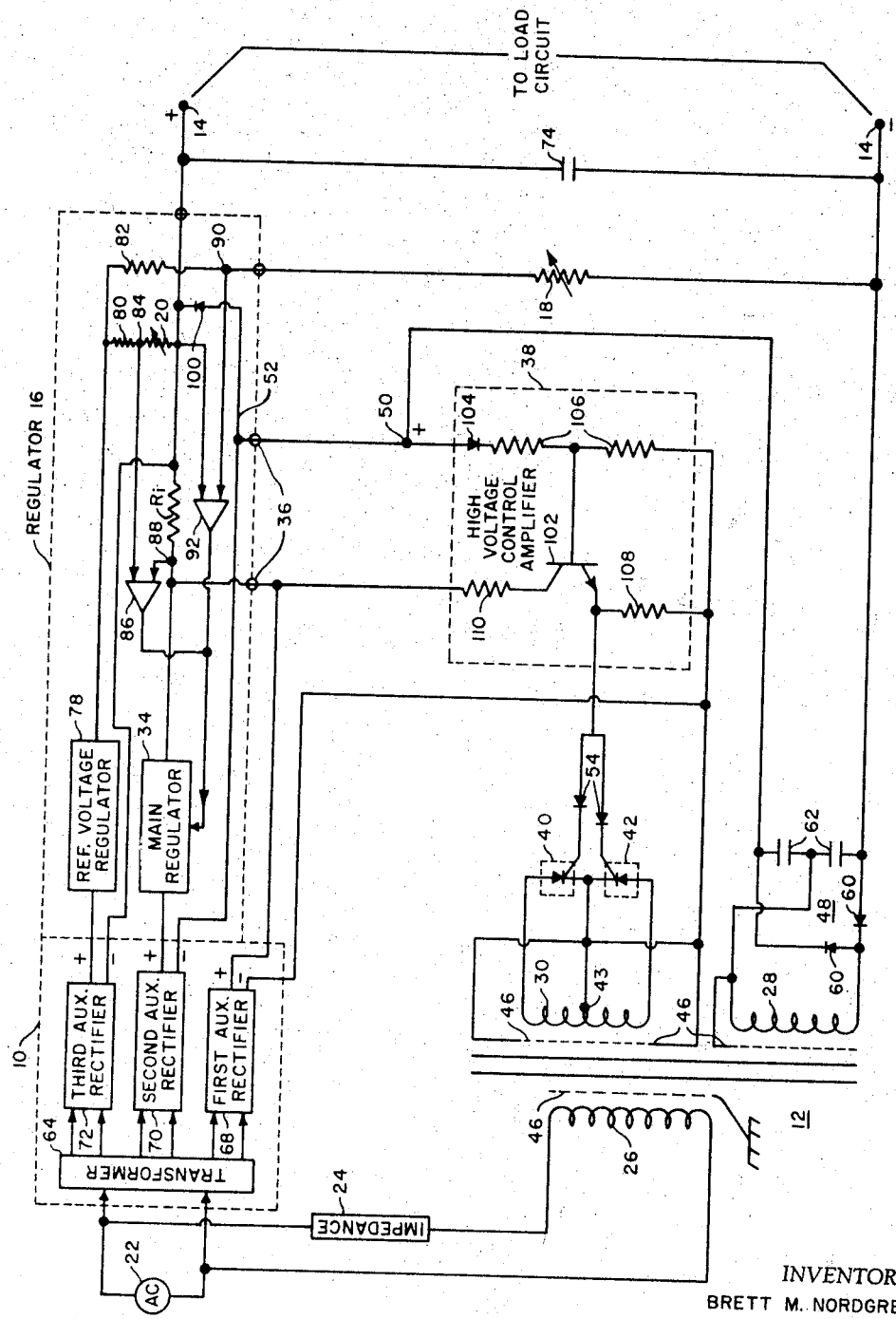

3,437,828
REGULATED POWER SUPPLY
Brett M. Nordgren, Berkeley, Heights, N.J., assignor to Hewlett-Packard Company, a corporation of California
Filed Mar. 18, 1966, Ser. No. 535,536
Int. Cl. H02j 1/04
U.S. Cl. 307—61                                8 Claims

ABSTRACT OF THE DISCLOSURE

High and low voltage power supplies are coupled in series to an output. The low voltage supply is regulated by a main regulating circuit. The high voltage supply includes a transformer having two secondary windings, one of which provides the high voltage output and the other of which is shorted by switching circuitry when the voltage drop across the main regulating circuit increases above a predetermined level. The shorted secondary winding loads the transformer and decreases the high voltage output therefrom until the total output voltage to the load is within a range that can be easily controlled by the main regulating circuit. In effect the system provides for "course" and "fine" adjustment of the load voltage.

---

This invention relates to a regulated power supply and, more particularly, to a power regulating system that facilitates the regulation of the output voltage and current supplied to a load even under high voltage conditions.

There is described in a U.S. Patent No. 3,161,778 issued Dec. 15, 1964, to Charles W. Harrison et al. and assigned to Hewlett-Packard Company a power supply popularly referred to as a "piggy-back" supply. In these supplies two separate power supplies are connected in series. The series regulator of one supply often rides on top of the main supply which is controlled by switching elements such as SCR's. A protective diode across the series regulator supply averts damage under overload conditions.

As more fully described by Harrison et al., supplies of this type are particularly useful to obtain higher voltage outputs without the use of expensive high voltage transistors and facilitate the incorporation of semiconductor circuitry with its accompanying efficiency and reliability as opposed to the use of vacuum tubes. In such circuitry, in order to protect the series regulatory element and to obtain high output voltage, especially with transistor circuitry, two separate power supply units are connected with their output circuits in series-aiding relationship and in series with the series regulator to supply the load. The regulating instructions to the series regulator are obtained by sensing the voltage across the load, which is contributed to by the two power supply units. Alternatively, the sensing device may sense the current in the load or both the load current and voltage may be sensed. Although the series regulator may be described as being associated equally with the two power supply units, for convenience in exposition the combination of the series regulator and its one immediately connected power supply unit will be termed a series regulated combination or series regulated supply. The power supply unit thus associated with the series regulator will preferably be the one of lower voltage. The other power supply unit may be in itself unregulated or partially regulated but will subsequently often be referred to as the main power supply unit. A protective unidirectionally conductive element such as a semiconductor diode is connected across the output of the series regulated supply but in such direction or polarity as to render the protective element normally non-conductive.

Under overload conditions, the relatively unregulated unit renders the protective device highly conductive substantially instantaneously, so that the protective device diverts substantially the full overload current from the series regulator until such time as a fuse or other relatively slowly acting protective device can act to break the circuit or to reduce the supply voltage to safe values.

Harrison et al. described several means of varying the voltage output of the main supply to conform with changes in the demanded load voltage or current in order to insure operation of the series regulator within its normal operating range. In one embodiment of the Harrison et al. invention, a variable resistor which is employed to set the value of load voltage is mechanically ganged with the means for varying the voltage output of the main supply. When the load voltage setting is changed, the voltage output of the main supply is changed correspondingly in the same direction. In another embodiment Harrison et al. use the voltage drop across the series regulator to actuate a motor or other device for controlling the means for varying the voltage output of the main supply.

One means described on which the motor acts is an autotransformer having an adjustable output voltage. Unfortunately, devices of this type are relatively slow acting compared with the operation of a series regulator and are unable to follow rapid changes in output load current which may exceed the operating range or capabilities of the series regulator. High voltage semiconductive elements such as SCR's can be employed to control directly the output of the main supply, but if high voltages are required, say, in the order of thousands of volts these elements become rather expensive and oft times unreliable.

It is, therefore, an object of this invention to obviate many of the disadvantages of the above-described power supplies.

Another object of this invention is to provide an improved power regulator system which is relatively fast-acting and yet employs relatively inexpensive components.

A regulated power supply is described which includes first and second power supply units and a series regulator connected in series with each other and with a load circuit. One of the power supply units, the main supply, is constructed to include a transformer with a primary and two secondary windings. One of the secondary windings may be a high voltage winding connected to supply power to the load circuit. As is conventional practice, the series regulator is controlled as a function of changes in the condition of the load circuit to maintain the load circuit conditions substantially constant.

In accordance with the invention, a current varying means is connected across the other secondary winding for varying its load thereby to vary the power delivered by the main supply. Means sensitive to a change in the operating condition of the series regulator controls the current varying means in such a manner as to limit the changes in the operating conditions of the regulator. Often it is desirable to include an impedance connected in series with the primary winding of the transformer to facilitate the control function.

The novel features that are considered characteristic of this invention are set forth with particularly in the appended claims. The invention, itself, however, both as to its organization and method of operation, as well as additional objects and advantages thereof, will best be understood from the following description when read in connection with the accompanying drawing, in which the sole figure is a partial block and partial schematic diagram of a regulated power supply system constructed in accordance with this invention.

In the sole figure there is seen first and second power supplies, one denoted by the dotted rectangle 10 and the other denoted by the transformer 12. The two power supplies 10 and 12 are shown connected in series-aiding relationship with each other at the terminal 50 and to a pair of output terminals 14 to which a load circuit may be connected. A regulator 16 is provided for the first power supply 10. The regulator 16 may be sensitive to either or both voltage and current changes of the load and act to maintain such voltage and/or such current circuitry constant at a level as determined by the voltage-control potentiometer 18 and the current-control potentiometer 20 as will be described hereinafter. The operation of the regulator 16 is conventional and as such constitutes no direct part of this invention. For that matter, although a series or main regulator 34 is illustrated, a shunt regulator may be employed if desired.

Both of the first and second power supplies 10 and 12, respectively, are connected to be supplied by a suitable source of alternating current (AC) line voltage denoted by the circle 22. In accordance with the invention, the source of line voltage 22 is connected through an impedance 24 which in a preferred form may comprise a choke coil so as to cause a reactive voltage drop in the primary winding 26 of the transformer 12 of the main or second power supply. The transformer 12 includes first and second secondary windings 28 and 30, respectively. The transformer 12 in a preferred form of the invention has a high voltage secondary winding 28; the remaining secondary winding 30 may be a low voltage winding. The voltage drop appearing across the main regulator 34 which appears at terminals 36 of the regulator 16, is amplified by what is shown as an emitter follower high voltage control amplifier denoted by the dotted rectangle 38, to control the conductivity of a pair of switches denoted by the dotted rectangles 40 and 42, respectively. These switches are connected from the respective terminals of the low voltage secondary winding 30 to a center tap 43 of the winding.

The windings of the transformer 12 are all suitably isolated by shields as denoted by the dotted lines 46 to permit the high voltage operation. The isolation shields 46 are returned to the center tap 43. The high voltage, second secondary winding 28 is connected to a conventional voltage doubler 48 which provides a thus-far unregulated high voltage between the terminal 50 and the negative output terminal 14. The terminal 50 is then serially connected to the negative bus 52 of the first power supply 10 whose output is connected through the regulator 16 to the positive output terminal 14.

Further in accordance with the invention, the variation in the voltage drop across the main regulator 34 or more correctly the regulated voltage output of the first supply 10, which appears across the terminals 36, is applied to the biased emitter follower amplifier 38. When its bias level is exceeded, the amplifier 38 conducts and applies a signal through a pair of isolating semiconductor diodes 54 to the switches 40 and 42. The switches 40 and 42 may, for example, be solid state controlled rectifiers such as silicon controlled rectifiers having main current conducting electrodes and a gate electrode. In the alternative the switches 40 and 42 may be transistor or other suitable switch element. In any event upon receipt of an actuating signal from the emitter follower amplifier 38 through the isolating diodes 54, the switches 40 and 42 are turned on thereby imposing a short circuit across the low voltage secondary winding 30. Since the secondary winding 30 is a low voltage winding, relatively low cost SCR's may be used. This loading or short circuit imposed upon the secondary winding 30 is reflected through the primary winding 26 and causes an increased current flow through the impedance 24. This lowers the voltage applied to the primary winding 26 of the transformer 12 so that the voltage of the high voltage secondary 28 is also reduced.

The operation of the circuit may perhaps be best understood by an example. If it is assumed that the load circuit draws a reduced current, the regulator 16, in order to maintain the output voltage across terminals 14 constant, increases the voltage drop across the main regulator 34 and hence reduces the negative voltage at the output terminals 36 of the first supply 10. The emitter follower amplifier 38 becomes forward biased and passes a voltage signal through the isolating diodes 54 to the gate or control electrodes of the switches 40 and 42 and the secondary winding 30 is shorted. This additional loading is maintained until such time as the voltage drop across the main regulator 34 decreases and again permits the emitter follower amplifier 38 to become non-conductive. The control imposed upon the high voltage portion of the power supply is thus seen to be an intermittent type control. It maintains the high voltage approximately at a desired level using circuit elements which are relatively inexpensive by varying the loading imposed upon a secondary winding of the high voltage transformer and permitting the regulator 16 to effect the fine regulation. The regulation effected by varying the loading of the transformer 12 is such as to maintain the voltage drop across the regulator 16 within the limits that it can effectively control the output voltage or current of the supply.

For the sake of completeness, the details of some of the circuit elements will be described although they are for the most part well known and the illustration is merely by way of example and not by way of limitation. The voltage doubler 48 is of conventional design and may include a pair of semiconductive diodes 60 and summing capacitors 62 connected in a conventional full-wave arrangement across the high voltage second winding 28. It is noted that a voltage doubler need not be employed at all. A conventional full-wave rectifier may be used. In any event the positive output of the doubler is connected to the terminal 50 and the negative output to the terminal 14.

The regulator 16 receives its input from the first power supply 10 which may comprise a conventional transformer 64 having several secondary windings which are connected to first, second, and third auxiliary rectifier and filter circuits 68, 70, and 72, respectively. The output of each of the auxiliary rectifiers 68, 70, and 72 supply voltages necessary for the operation of the regulator 16 and for the biasing of the emitter follower amplifier 38. The negative bus 52 is connected to the negative terminal of the second auxiliary rectifier 70. The positive terminal (denoted by the plus sign) of the second auxiliary rectifier 70 is connected to the main regulator 34 which may comprise in this case a suitable NPN transistor, thence through a current-sensing resistor $R_i$ to the output terminal 14. A capacitor 74 may be connected across the output terminals 14. The third auxiliary rectifier 72 has its positive output terminal (denoted by the plus sign) connected through a conventional reference voltage regulator 78 which may, for example, comprise a Zener diode through a first voltage divider network including a fixed resistor 80 and the current adjusting potentiometer 20 to the output terminal 14 and also through a fixed resistor 82 and the voltage adjusting potentiometer 18 to the negative terminal 14 of the power supply.

The junction point 84 of the current voltage divider is connected to one input of a conventional comparison or differential amplifier 86. The remaining input to the comparison amplifier is taken from a point 88 between the current-sensing resistor $R_i$ and the main regulator 34 so as to compare the voltage drop created across the current summing resistor $R_i$ to a desired level denoted by the setting of the potentiometer 20. In like manner the reference voltage derived at the junction 90 of the voltage divider network 82–18 is compared to the actual output voltage at the positive output terminal 14 by a second comparison amplifier 92. The outputs of both of the comparison amplifiers 86 and 92 are thence summed and connected to control the main regulator 34. Circuits of this type as employed for the regulator 16 are well known and hence will not be elaborated upon further. One circuit of this type is described, by way of example, in U.S.

Patent 3,158,801 issued Nov. 24, 1964, to D. J. Tighe et al.

A conventional short circuit protection diode 100 may be connected across the regulator 16 in conventional manner as described in the Harrison et al. patent. The emitter follower amplifier 38 may be of conventional type and may include a transistor 102 having base, collector and emitter electrodes. The base electrode of the transistor 102 is biased by a voltage divider network including an isolating diode 104 and a pair of resistors 106 which are serially connected between the output junction 50 of the high voltage supply and the center tap 42 of the second secondary winding 30. The emitter of the transistor 102 may be connected through an emitter resistor 108 also to the center tap 43. A collector bias voltage is supplied from the first auxiliary rectifier 68. A collector resistor 110 is connected to the positive terminal of the first auxiliary rectifier 68 in combination to form the emitter follower amplifier. The negative terminal of the first auxiliary rectifier 68 is returned to the center tap 43.

There has thus been described a relatively economical, yet efficient high voltage power supply which is quite reliable inasmuch as it uses solid state components and yet does not require the usage of such components for high voltage capabilities.

It will be obvious that various modifications may be made in the apparatus and in the manner of operating it. It is intended to cover such modifications and changes as would occur to those skilled in the art, as far as the following claims permit and as far as consistent with the state of the prior art.

What is claimed is:

1. A regulated power supply system comprising, in combination:
   a pair of load terminals,
   first and second power supplies and a series regulator connected in series with each other and adapted to be connected to said load terminals,
   one of said power supplies including a transformer having a primary and first and second secondary windings, said first secondary winding adapted to supply power to said load terminals,
   means sensitive to a change of condition at said load terminals to actuate said regulator thereby to maintain substantially constant the said condition at said load terminals,
   current varying means connected across said second secondary winding for varying its loading thereby to vary the voltage delivered by at least one of said power supply units, and
   means sensitive to a change in the operating condition of said regulator for controlling said current varying means thereby to limit said changes in the operating condition of the regulator.

2. The power supply system set forth in claim 1 which also includes an impedance means connected in series with said primary winding thereby to decrease the power supplied to said primary winding in accordance with the loading imposed upon said second secondary winding.

3. The power supply system set forth in claim 2 wherein said impedance means comprises a choke coil.

4. The power supply system set forth in claim 2 wherein:
   said secondary winding has a center tap and a pair of output terminals,
   said current varying means comprising a pair of switching means connected respectively between one of said output terminals in said center tap of said second secondary winding thereby to vary the loading of said second secondary winding.

5. The power supply system set forth in claim 1 wherein said current varying means comprises a switch means for shorting said second secondary winding.

6. The power supply system set forth in claim 5 wherein said switch means comprises:
   a solid state controlled rectifier having a main current conducting electrode connected to the said second secondary winding and a gate electrode,
   said gate electrode being connected to receive a firing current in accordance with changes in the operating condition of said regulator.

7. The power supply system set forth in claim 1 which also includes an impedance means connected in series with said primary winding and wherein said current varying means comprises a switch means for shorting said second secondary winding.

8. The power supply system set forth in claim 7 which also includes an impedance means connected in series with said primary winding,
   wherein said switch means comprises a solid state controlled rectifier having a main current conducting electrode connected to the said second secondary winding, and a gate electrode,
   said gate electrode being connected to receive a firing current in accordance with changes in the operating condition of said regulator.

References Cited

UNITED STATES PATENTS

| | | | |
|---|---|---|---|
| 2,806,963 | 9/1957 | Woll | 307—61 |
| 3,101,442 | 8/1963 | Darbie | 323—22 |
| 3,161,778 | 12/1964 | Harrison et al. | 307—61 |
| 3,185,856 | 5/1965 | Harrison | 307—55 |

ROBERT K. SCHAEFER, *Primary Examiner.*

H. J. HOHAUSER, *Assistant Examiner.*